US010862672B2

(12) United States Patent
Scott et al.

(10) Patent No.: US 10,862,672 B2
(45) Date of Patent: Dec. 8, 2020

(54) WITNESS BLOCKS IN BLOCKCHAIN APPLICATIONS

(71) Applicant: INTUIT INC., Mountain View, CA (US)

(72) Inventors: Glenn Scott, Mountain View, CA (US); Michael R. Gabriel, Mountain View, CA (US)

(73) Assignee: INTUIT, INC., Mountain View, CA (US)

( * ) Notice: Subject to any disclaimer, the term of this patent is extended or adjusted under 35 U.S.C. 154(b) by 280 days.

(21) Appl. No.: 15/791,531

(22) Filed: Oct. 24, 2017

(65) Prior Publication Data

US 2019/0123890 A1  Apr. 25, 2019

(51) Int. Cl.
*H04L 9/06* (2006.01)
*H04L 9/32* (2006.01)

(52) U.S. Cl.
CPC .......... *H04L 9/0637* (2013.01); *H04L 9/0643* (2013.01); *H04L 9/3239* (2013.01); *H04L 2209/38* (2013.01)

(58) Field of Classification Search
CPC ... H04L 9/0637; H04L 9/0643; H04L 9/3239; H04L 2209/38
USPC .......................................................... 380/28
See application file for complete search history.

(56) References Cited

U.S. PATENT DOCUMENTS

| | | | |
|---|---|---|---|
| 9,774,578 B1 * | 9/2017 | Ateniese | G06F 3/0619 |
| 10,348,488 B1 * | 7/2019 | Paczkowski | H04L 9/0637 |
| 10,521,780 B1 * | 12/2019 | Hopkins, III | G06Q 20/10 |
| 2004/0229638 A1 * | 11/2004 | Zimba | H04L 29/06 455/514 |
| 2008/0229037 A1 | 9/2008 | Bunte et al. | |
| 2009/0288454 A1 | 11/2009 | Lee et al. | |
| 2017/0234428 A1 | 8/2017 | Spooner et al. | |
| 2017/0344435 A1 * | 11/2017 | Davis | G06F 11/1464 |
| 2018/0091524 A1 * | 3/2018 | Setty | H04L 63/12 |
| 2018/0165476 A1 * | 6/2018 | Carey | G06F 21/64 |
| 2018/0323963 A1 * | 11/2018 | Stollman | H04L 9/3239 |
| 2019/0035014 A1 * | 1/2019 | Bell | H04L 9/3239 |

FOREIGN PATENT DOCUMENTS

WO     2000025235 A1    5/2000

OTHER PUBLICATIONS

International Searh Report/Written Opinion issued to PCT/US2018/052344 dated Jan. 15, 2019.

* cited by examiner

*Primary Examiner* — Alexander Lagor
*Assistant Examiner* — Moeen Khan
(74) *Attorney, Agent, or Firm* — Patterson & Sheridan LLP

(57) ABSTRACT

Techniques are disclosed for managing data of an application. One embodiment presented herein includes a computer-implemented method, which includes scanning a distributed system to identify one or more blocks comprising data associated with the application. The method further includes generating a witness block based on the one or more blocks. The witness block may comprise a state of the data from the one or more blocks. The method further includes adding the witness block to the distributed system.

18 Claims, 6 Drawing Sheets

WITNESS BLOCKS IN BLOCKCHAIN APPLICATIONS

FIELD

The present disclosure relates generally to techniques for improving the efficiency of storing and accessing application data in distributed systems, and more particularly to using witness blocks to represent the state of all data related to an application that precedes the witness block in a distributed system.

BACKGROUND

Distributed systems may comprise hash chains (e.g., blockchains), which are data structures that record data in a fashion analogous to a chain. Each update to the chain creates a new block containing the data and each block is linked to the previous block by a cryptographic function. Blocks are generally appended to the end of the chain and, once in the chain, resist modification so that the cryptographic links in the chain are preserved. Entities (e.g., applications) that receive data from blocks of the chain may check the cryptographic links to test the validity of the chain. Any modification of a block is detected and subject to remedial or other action. Hash chains are generally managed by peer-to-peer networks, which collectively adhere to an established protocol for validating each new block and are designed to be inherently resistant to modification of data. Once recorded, the data in any given block cannot be modified without the alteration of subsequent blocks and the involvement of the network.

A chain generally has no upper limit in its storage requirements. This means that, as blocks are appended, the chain grows without bound. As a result, a chain consumes an increasing amount of storage resources as it is updated. Furthermore, while chains may exist forever, applications and application execution do not, and, as a consequence, applications that store data on the chain may be required to scan the entire chain at least once (e.g., when they start) to establish with certainty the complete content or context of data relevant to the application. As chains increase in length, this process requires a corresponding increase in resources, including time and processing power.

SUMMARY

One embodiment presented herein includes a computer implemented method for managing data of an application. The method generally includes scanning a distributed system to identify one or more blocks comprising data associated with the application. The method further includes generating a witness block based on the one or more blocks, wherein the witness block comprises a state of the data from the one or more blocks. The method further includes adding the witness block to the distributed system.

Additional embodiments include a computing device having a processor and a memory storing one or more application programs configured to perform the methods disclosed herein and a non-transitory computer-readable storage medium storing instructions, which when executed on a processor perform the methods disclosed herein.

DETAILED DESCRIPTION

Figure 1:
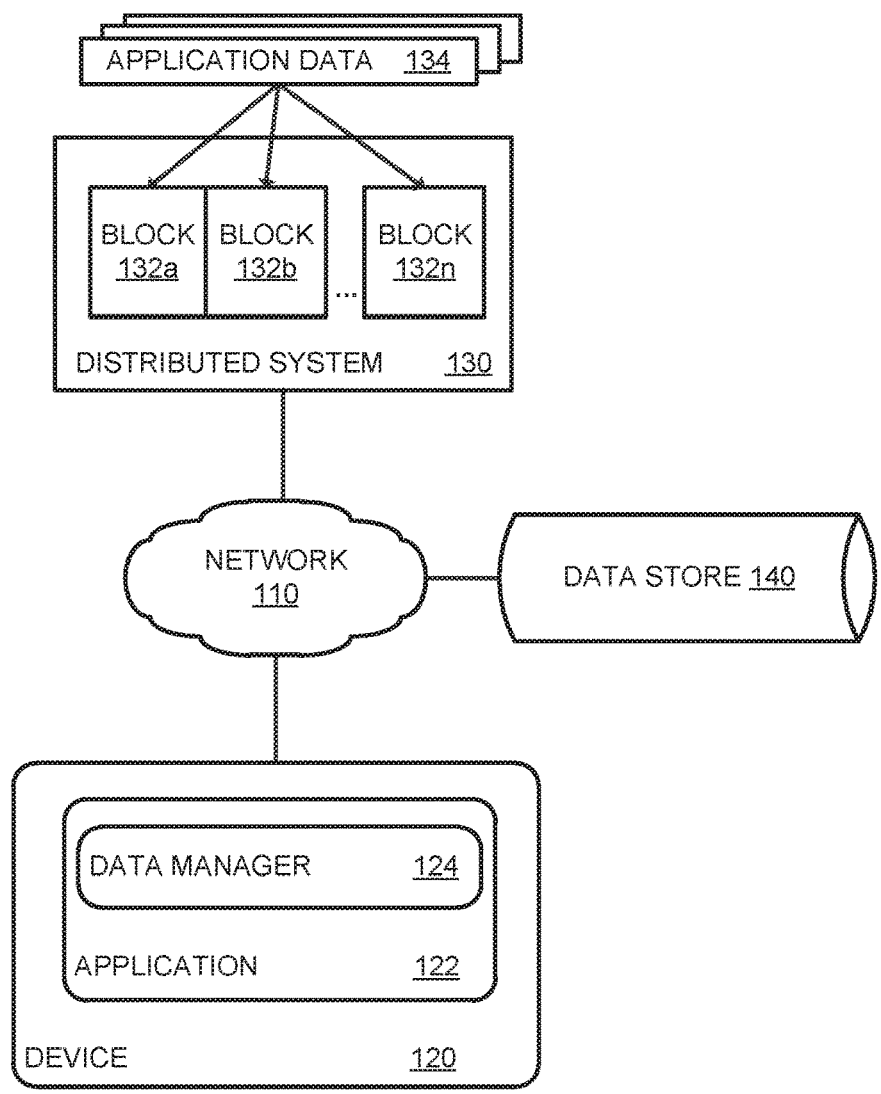
FIG. 1 illustrates an example of a computing environment used for managing application data with witness blocks, according to one embodiment.

Embodiments presented herein provide techniques for managing application data in distributed systems. More specifically, embodiments presented herein involve the use of witness blocks in distributed systems to manage application data.

Application data may be maintained in a distributed system, such as a hash chain, which comprises a plurality of blocks. In some embodiments, the distributed system may maintain data associated with a single application, while in other embodiments the distributed system may maintain data associated with a plurality of applications. Every time an application writes a data update to the chain, it is appended as a new block. Each block may be resistant to modification and may contain cryptographic information that links to the preceding block and/or the subsequent block. Over time, it may become inefficient for an application to manage and access its data on the chain, as this may require frequently scanning through a very long chain to identify relevant data. As such, embodiments of the present disclosure involve the use of witness blocks that represent the state of some or all previous data on the chain relating to a particular application. References herein to the "state" of the data may be understood to refer to the current value(s) of the data associated with an application (e.g., the most current value of a user's home address stored on the chain, and the like).

According to one embodiment, an application may identify all blocks on a distributed system (e.g., a hash chain or blockchain) containing data related to the application. Based on these identified blocks, the application may then create a "witness block" that represents the state of all previous data related to the application on the chain. For example, the witness block may comprise all of the data from the identified blocks or, alternatively, may contain references to the identified blocks that contain the data. The application may then append the witness block to the end of the chain. The application may then be able to more efficiently access its data on the distributed system by retrieving the data from the witness block, and it will not have to search the entire chain to determine the state of relevant data.

In some embodiments, the previous blocks from which a witness block was created may be deleted, archived (e.g., in a storage location separate from the distributed system), or replaced (e.g., with null blocks, as described below) in order to improve storage efficiency. When multiple applications store data on the chain, for example, it may not be possible to delete blocks once a witness block has been created, as the blocks may be needed to verify the validity of other blocks in the chain (e.g., using the cryptographic link information that is stored in every block). As such, the blocks may instead be replaced with null blocks that do not contain the data from the original blocks, but only contain the cryptographic link information (e.g., a cryptographic function, such as a hash, in each block linking to the previous block in the chain) from the original blocks. In some embodiments, when a series of continuous blocks on the chain are attested to by witness blocks and/or have been replaced with null blocks, the blocks may be removed, archived, or collapsed (e.g., into a single null block containing cryptographic link information).

Creating a witness block may involve the creation of a hash tree (e.g., Merkle tree) based on the blocks from which the witness block is generated. For example, each block may be hashed to form the bottom leaves of a tree structure. Each leaf pair may then be then combined and hashed to form the next tree layer. This may be repeated until a single root hash is created at the top. The root hash may then be stored in the witness block for the chain. To prove that a block was in the chain, the distributed system may send the block along with the adjacent leaves that lead up to the root hash. This may involve sending just two leaves (hashes) per level in the tree. The recipient (e.g., an application) can then confirm the block is correct by computing the block hash and re-computing the hash tree for the provided leaves. It the root hash matches the final hash, the block is proven to be correct, and a member of the witnessed chain. Other techniques for security and verification may be employed as well without departing from the scope of the present disclosure.

One of ordinary skill in the art will recognize that the techniques described herein may be adapted for use by a broad variety of software applications, online or web services, software features, or support services where data may be stored in a distributed system. Additionally, it should be noted that although, in certain examples described herein, particular computing devices or components are described as performing certain tasks (e.g., storing and identifying data, generating witness blocks, retrieving and validating data, etc.), such tasks may be performed by one or more additional local or remote computing devices or components (e.g., connected via a wired or wireless network).

FIG. 1 illustrates an example of a computing environment 100 used to manage application data with witness blocks, according to embodiments of the present disclosure. As shown, the computing environment 100 includes device 120, distributed system 130, and data store 140, connected via network 110. The network 110, in general, may be a wide area network (WAN), local area network (LAN), wireless LAN (WLAN), personal area network (PAN), a cellular network, etc. In a particular embodiment, the network 110 is the Internet.

Device 120 is representative of a computing system, such as a desktop or laptop computer, tablet, mobile phone, Internet of Things (IoT) device, other smart device, or the like, which executes one or more applications that maintain data on distributed system 130 (which may, for example, comprise a hash chain or blockchain). For example, device 120 includes an application 122. The application 122 may be representative of a component of a client server application (or other distributed application), which can communicate with distributed system 130 over network 110. Application 122 may be a conventional software application (e.g., a tax preparation application) installed on device 120, and may communicate with distributed system 130 over network 110 in order to store, manage, and retrieve application data 134 stored in blocks 132a-n.

In one embodiment, application 122 communicates with distributed system 130 at run-time (e.g., over network 110 using a protocol such as TCP/IP). For example, application 122 may store its associated application data 134 in blocks 132a-n. Application data 134 may, for example, comprise data associated with the execution of application 122, such as user data. For example, block 132a may comprise a user's name, block 132b may comprise the user's address, block 132c may comprise the user's date of birth, block 132d may comprise an update to the user's address, and so on. Application 122 may then access application data 134 (e.g., the user's name, address, date of birth, etc.) as needed during execution (e.g., when application 122 is first launched, it may retrieve the state of all of its application data 134 from distributed system 130).

Application 122 comprises a data manager 124, which performs operations related to managing application data 134 using witness blocks, according to embodiments of the present disclosure. For example, data manager 124 may scan through blocks 132a-n in order to identify which blocks contain application data 134 (e.g., data relevant to application 122 rather than data associated with other applications). Data manager 124 may then create a witness block based on the identified blocks. For example, the witness block may comprise the state of all the application data 134 that was stored on the identified blocks of blocks 132a-n, which contain application data 134. In some embodiments, the application data 134 from the identified blocks is included in the witness block, while in other embodiments the witness block only contains references to the identified blocks containing application data 134.

In some embodiments, after creating a witness block based on one or more blocks, data manager 124 may move the one or more blocks to a separate remote storage (e.g., archiving the one or more blocks in data store 140) and use a hash tree to confirm the authenticity of the one or more blocks stored separately from distributed system 130. For example, data manager 124 may compute a hash tree at the time of storage based on the one or more blocks, and store the root hash in the witness block. Later, when application data 134 is requested (e.g., by application 122), distributed system 130 may provide (e.g., through a service which retrieves data from separate storage such as data store 140) the data from the one or more blocks on data store 140 along with the root hash from the witness block as a "proof", so that data manager 124 may compute the hash tree from the one or more blocks and verify that it matches the root hash from the witness block. This allows for data stored separately from distributed system 130 to be verified using data known to be located on distributed system 130 (which is therefore trustworthy). In certain embodiments, if only a single block of the one or more blocks is returned to data manager 124 in response to a request for data (e.g., distributed system 130 only retrieves and returns a single block from data store 140 containing the requested data), distributed system 130 may retrieve and return the adjacent "leaves" leading up to the root hash in the hash tree (e.g., the two blocks adjacent to the single block, each of which includes a hash). Data manager 124 may then compute the root hash using the adjacent leaves and verify that it matches the root hash received from the witness block. This allows for improved efficiency, as distributed system 130 does not have to retrieve all of the blocks, but only the block containing the requested data and the blocks comprising the two adjacent "leaves" from the hash tree.

In certain embodiments, data manager 124 may perform actions to clean up the chain after creating a witness block and appending it to the chain. For example, if the chain only stores data associated with one application (e.g., application 122), then data manager 124 may delete or archive (e.g., to data store 140 as described above) the identified blocks (which may comprise all previous blocks in the chain), as they would all be attested to by the witness block. In other embodiments, such as when the chain stores data associated with multiple applications, data manager 12 may leave the identified blocks in place or, alternatively, replace them with null blocks including only the cryptographic link information from the identified blocks for security and verification purposes. In some embodiments, when a segment of the oldest part of the chain is attested to by witness blocks, that portion of the chain is superfluous and eligible for removal or archival. Furthermore, in certain embodiments, a continuous series of null blocks and/or other blocks, which are attested to by witness blocks (without any interstitial blocks that are not attested to by witness blocks, such as blocks comprising data related to other applications which have not been used to create witness blocks), may be collapsed into a single null block that contains cryptographic link information from all of the collapsed blocks, or at least cryptographic link information from the first and last block of the continuous series for security and verification purposes.

Distributed system 130 may comprise one or a plurality of devices (e.g., separate computing systems such as servers) sharing resources and capabilities in order to provide users with a single and integrated coherent network comprising blocks 132a-n. In some embodiments, distributed system 130 comprises a hash chain, such as a blockchain. Blocks 132a-n may, for example, comprise blocks in a blockchain. Application data 134 may, for example, comprise data associated with application 122, and is stored on one or more of blocks 132a-n. Distributed system 130 may manage the addition and removal of blocks 132a-n from the chain using any number of techniques known in the art, such as a consensus protocol or trusted authority. In certain embodiments, for example "miners" may be employed, as is known in the art, to ensure the integrity of modifications to the chain. Distributed system 130 may return application data 134 in response to requests (e.g., from application 122), and may also include cryptographic link information from one or more blocks 132 that were the source of requested data in the response for security and verification purposes. Distributed system 130 may also include root hashes, hash trees, and other relevant information in a response.

Data store 140 may comprise a physical or virtual storage entity, and may comprise one or more local or remote components. In certain embodiments, for example, data manager 124 may store one or more of blocks 132a-n in data store 140 (e.g., for the purpose of archiving the blocks so that they may be removed or replaced on distributed system 130) after creating a witness block based on the one or more of blocks 132a-n. As described herein, data manager 124 may compute a hash tree based on the one or more of blocks 132a-n and thereafter store the root hash in the witness block. When, for example, application 122 retrieves the archived blocks from data store 140 (e.g., through a service of distributed system 130), distributed system 130 will also return the root hash from the witness block so that the application may compute the hash tree from the archived blocks and determine whether the root hash of the computed hash tree matches the root hash received from the witness block. As such, application 122 (or another requesting entity) is able to determine the authenticity of archived blocks which are stored separately from distributed system 130 using information stored on distributed system 130.

Embodiments of the present disclosure improve the functioning of computing devices, such as Device 120, and applications running on those devices by reducing the processing power and time required to locate and retrieve relevant application data as needed during execution of applications, which may beneficially increase the battery life and other performance characteristics of such devices. In fact, such devices may be able to use lower-power and less expensive processing hardware or may run faster using standard hardware. Furthermore, the ability to optimize a distributed system (e.g., a hash chain) by, for example, removing, archiving, collapsing, or replacing blocks in the distributed system with null blocks, may improve storage efficiency and thereby lower storage requirements for the device. Additionally, reducing the amount of distributed system data (e.g., the number of blocks) that may need to be accessed via Network 110 may improve the utilization of network resources (e.g., data used by the device). Advantageously, by "cleaning up" a distributed system (e.g., a hash chain), embodiments of the present disclosure may result in fewer cryptographic calculation operations, thereby improving both processing and power efficiency of computing devices involved. Techniques described herein may therefore allow for distributed systems to more effectively maintain data associated with one or more applications.

Figure 2:
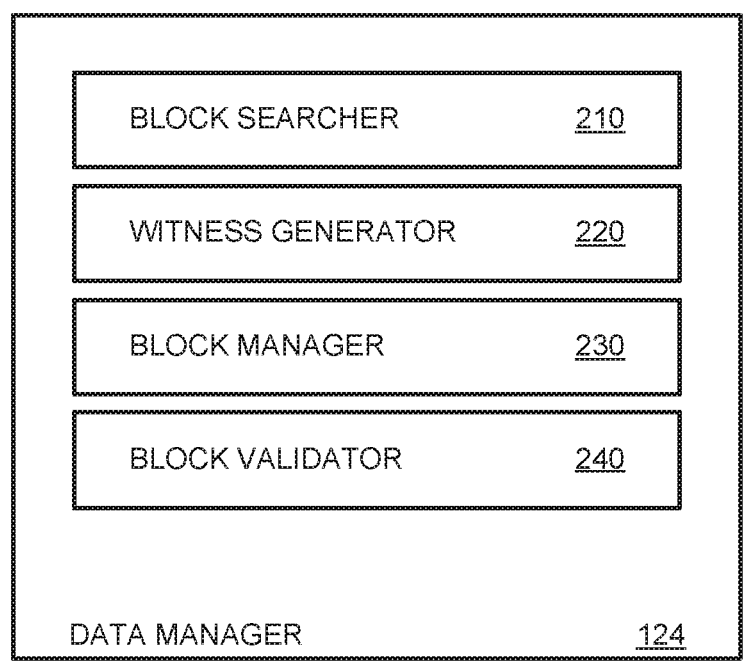
FIG. 2 illustrates components of a data manager, according to one embodiment.

FIG. 2 illustrates components of data manager 124 described relative to FIG. 1, according to one embodiment. As shown, the data manager 124 comprises a block searcher 210, a witness generator 220, a block manager 230, and a block validator 240. Each of these components may perform functions of data manager 124 associated with techniques described above. In other embodiments, the functions of data manager 124 may alternatively by performed by any number of local or remote components.

For example, block searcher 210 may search through blocks 132a-n of distributed system 130 in order to identify blocks containing application data 134 relating to application 122. This may be done, for example, when application 122 is first launched or at some other time during execution of application 122. In certain embodiments, block searcher 210 may identify one or more existing witness blocks containing application data 134, and may include these existing witness blocks as identified blocks for the creation of the new witness block. Once block searcher 210 has identified blocks containing application data 134, block searcher 210 may then provide the identified blocks to witness generator 220, which may generate one or more witness blocks that represent the state of the application data 134 from the identified blocks. For example, witness generator 220 may include all of the application data 134 from the identified blocks in one or more witness blocks. Alternatively, witness generator 220 may include references to the identified blocks in a witness block. In alternative embodiments, witness generator 220 may generate more than one witness block based on the identified blocks (e.g., the identified blocks may be broken up into groups, and each group may be attested to by a witness block). In some embodiments, witness generator 220 may also generate a hash tree based on the identified blocks, storing the root hash in the witness block so that the identified blocks can be moved to separate storage (e.g., data store 140) and still be authenticated. Once the witness block has been generated, witness generator 220 may provide the witness block to distributed system 130 to be appended to the chain.

Block manager 230 may manage identified blocks after they have been used to generate a witness block that has been appended to the chain of distributed system 130. For example, block manager 230 may remove, archive, collapse, or replace the identified blocks with null blocks (e.g., containing only cryptographic link information) as appropriate under the circumstances (e.g., based on whether distributed system 130 maintains data associated with other applications and/or whether there is a series of continuous blocks that are represented by witness blocks or replaced by null blocks).

Block validator 240 may validate data received from distributed system 130 (e.g., in response to a request sent from application 122 for application data 134, such as when application 122 is first launched or at another time during execution of application 122). For example, block validator 240 may compute a hash tree based on information received from distributed system 130 and use it to determine whether a root hash received from distributed system 130 is accurate.

Figure 3:
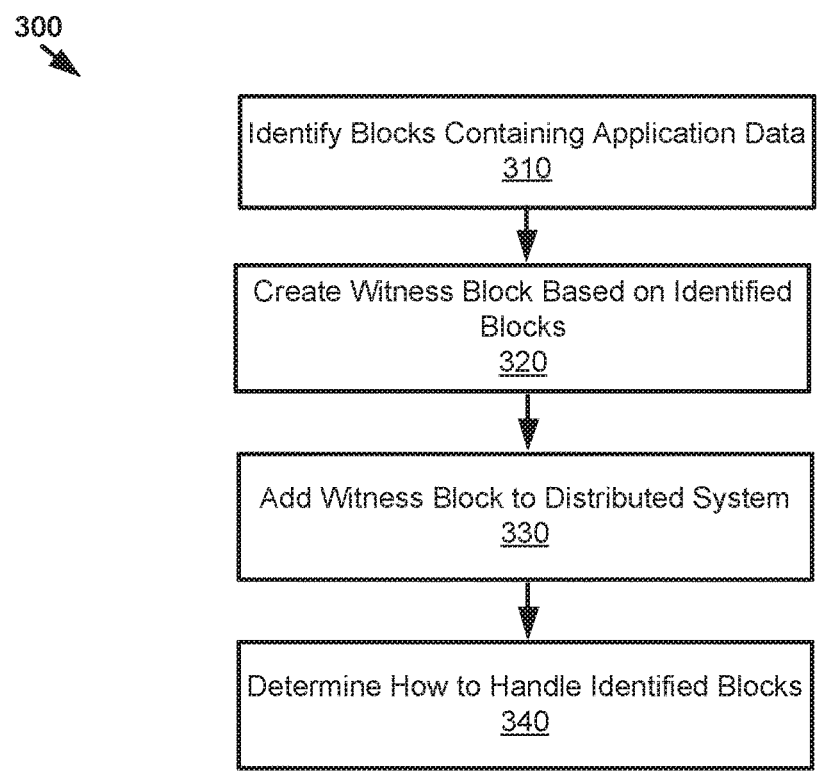
FIG. 3 illustrates example operations for managing application data with witness blocks, according to one embodiment.

FIG. 3 illustrates example operations 300 for managing application data with witness blocks, according to one embodiment. Operations 300 may be performed, for example, by data manager 124 of device 120.

At 310 data manager 124 identifies blocks of distributed system 130 containing data associated with application 122. For example, operation 310 may be performed by data manager 124 when application 122 is launched or at some other time during execution of application 122.

At 320, data manager 124 creates a witness block based on the blocks identified at 310. For example, data manager 124 may generate a witness block containing the application data 124 from the identified blocks or, alternatively, references to the identified blocks. In some embodiments, data manager 124 may further generate a hash tree based on the identified blocks, and store the root hash in the witness block to be used later for security and verification purposes when data from the witness block is requested from distributed system 130.

At 330, data manager 124 provides the witness block to distributed system 130 to be appended to the chain. In some embodiments, for example, the witness block may be signed by an entity entrusted with creating witness blocks in order to confirm its authenticity. In other embodiments, the witness block may be ratified by a consensus protocol that governs content on the chain of distributed system 140. This consensus protocol may, for example, ensure that the witness block represents the state of all application data 134 from all previous blocks in the chain that relate to the application 122, and that any distributed copies of the chain are updated at the same time (e.g., using techniques known in the art).

At 340, data manager 124 determines how to handle the identified blocks. For example, data manager 124 may determine whether to remove, archive, collapse, leave the blocks alone, and/or replace the identified blocks with null blocks. Operation 340 will be described in more detail below with respect to FIG. 4.

Figure 4:
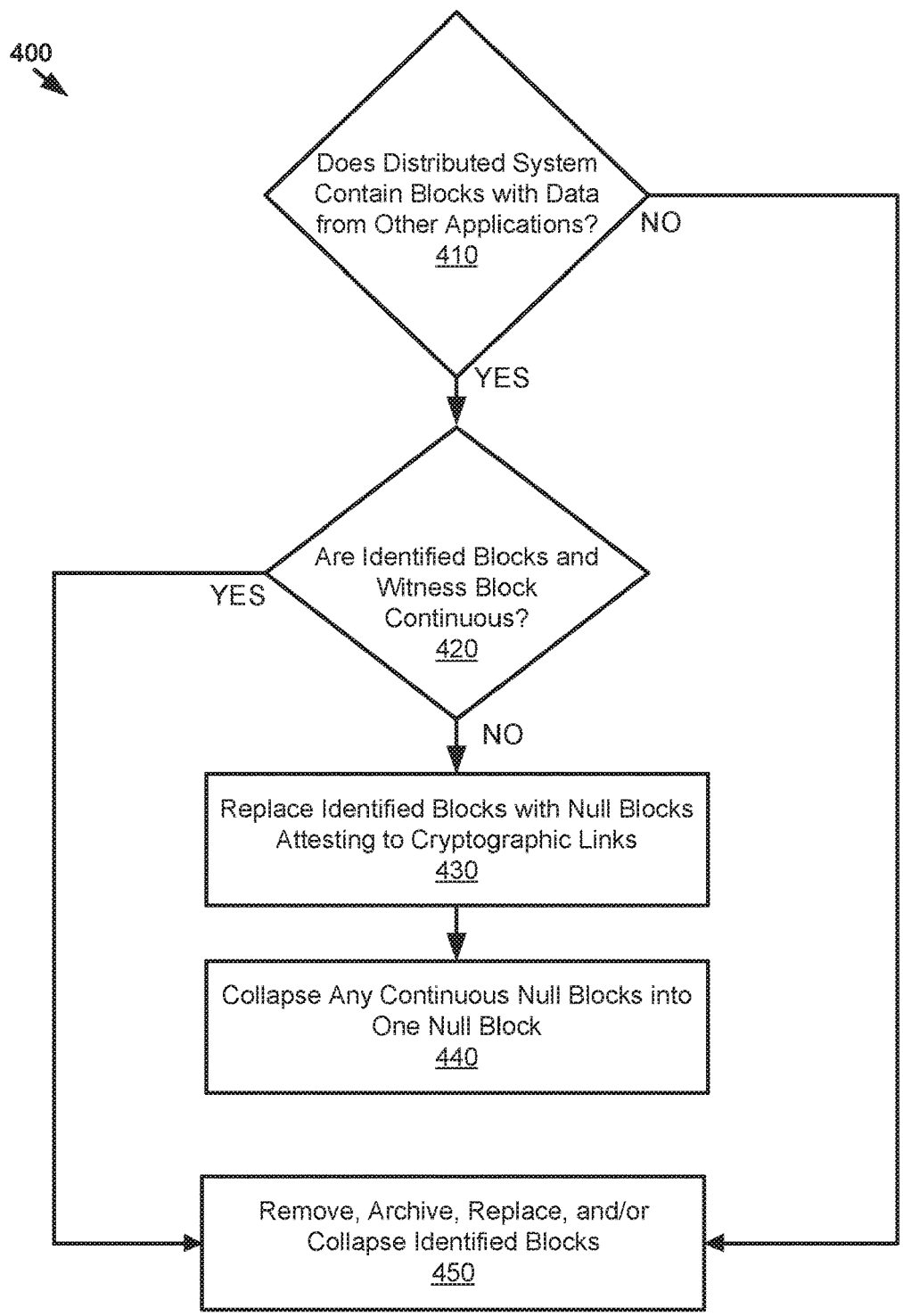
FIG. 4 illustrates additional example operations for managing application data with witness blocks, according to one embodiment.

FIG. 4 illustrates additional example operations 400 for managing application data with witness blocks, according to one embodiment. Operations 400 may be performed, for instance, by data manager 124 after operations 300 have been completed (or as part of operation 340).

At 410, data manager 124 determines whether distributed system 130 contains data from other applications besides application 122. For example, data manager 124 may scan distributed system 130 to identify blocks containing data associated with other applications. If distributed system 130 does not contain data from other applications (e.g., the chain on distributed system 130 only includes application data 134 from application 122), then operations continue at 450. Otherwise, operations continue at 420.

At 420, data manager 124 determines whether the identified blocks (e.g., the blocks identified at step 310 in FIG. 3) and the witness block are continuous (e.g., whether there are any interstitial blocks associated with other applications). If the identified blocks and witness block are continuous, then operations continue at 450. Otherwise, operations continue at 430.

At 430, data manager 124 replaces the identified blocks with null blocks containing only the cryptographic link information from the identified blocks. This allows for the integrity of the chain to be verified by requesting entities, but frees up some storage space by removing the data previously stored in the identified blocks. Alternatively, the identified blocks may be left alone. In both cases, the integrity of the chain will be attested to by cryptographic link information.

At 440, data manager 124 collapses any continuous null blocks (e.g., any series of null blocks not interrupted by interstitial blocks) into a single null block. For example, the single null block may contain the cryptographic link information from some or all of the null blocks that are collapsed. This allows for improved storage efficiency (e.g., of distributed system 130) while still maintaining the integrity of the chain's cryptographic link information for security and verification purposes.

At 450 (following either 410 or 420 above), data manager 124 removes, archives, replaces, and/or collapses the identified blocks. This step is reached only if distributed system 130 only contains data from one application (e.g., "no" at 410) or if the identified blocks and the witness block are continuous (e.g., "yes" at 420). In these cases, the identified blocks do not need to be left on the chain (or replaced with null blocks) to preserve the integrity of the chain, as there are no interstitial blocks that would rely on cryptographic link information from the identified blocks. As such, the identified blocks can be handled in a plurality of different ways as appropriate (e.g., removal, archival, replacement, or collapse). This may improve the storage efficiency of the chain by reducing the number of blocks storing application data 134 and removing redundancy.

Figure 5:
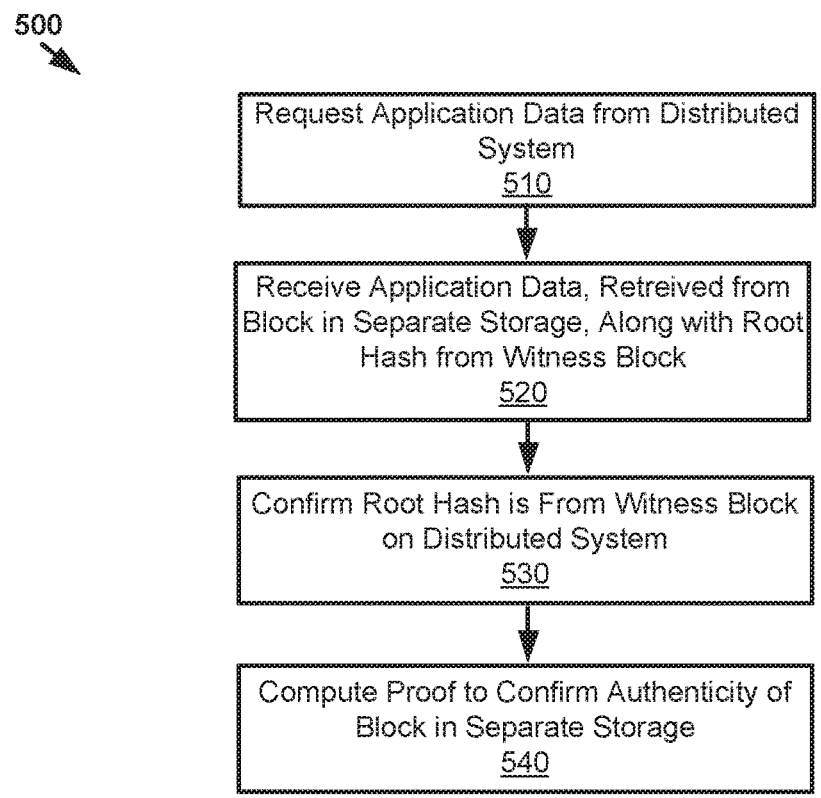
FIG. 5 illustrates example operations for retrieving application data attested to by witness blocks, according to one embodiment.

FIG. 5 illustrates additional example operations 500 for retrieving and verifying application data attested to by witness blocks when the application data is stored separately from distributed system 130, according to embodiments of the present disclosure. Operations 500 may be performed, for instance, by data manager 124 when application data 134 is needed by application 122 (e.g., at startup or at some other point during runtime).

At 510, data manager 124 requests application data 134 from distributed system 130. This may, for example, comprise a request for some or all of application data 134 as applicable under the circumstances.

At 520, data manager 124 receives the requested application data 134, retrieved by distributed system 130 from one or more archived blocks on data store 140, as a response from distributed system 130. The response may also include a root hash (e.g., from the witness block) as a "proof" of the authenticity of the one or more archived blocks which are stored separately from distributed system 130.

At 530, data manager 124 confirms that the root hash is from a witness block on distributed system 130. This may be accomplished, for example, using a binary or O(n) search, as is known in the art, or any other method of searching distributed system 130 to confirm that the root hash is present in the witness block.

At 540, data manager 124 computes a hash tree based on the one or more archived blocks, comparing the root hash of the computed hash tree to the root hash (e.g., the proof) received from the witness block to confirm that the one or more archived blocks are valid. For example, data manager 124 may calculate the hash tree using adjacent leaf information of the one or more archived blocks received from distributed system 130 (e.g., the one or more archived blocks may be retrieved by distributed system 130 from data store 140 and provided to data manager 124 by distributed system 130) and determine whether the results of the calculation match the root hash (e.g., the proof) received from the witness block. If data manager 124 determines that the root hashes match, then the received application data 134 can be trusted for use by application 122. Otherwise, the received application data 134 may, for example, be discarded.

Figure 6:
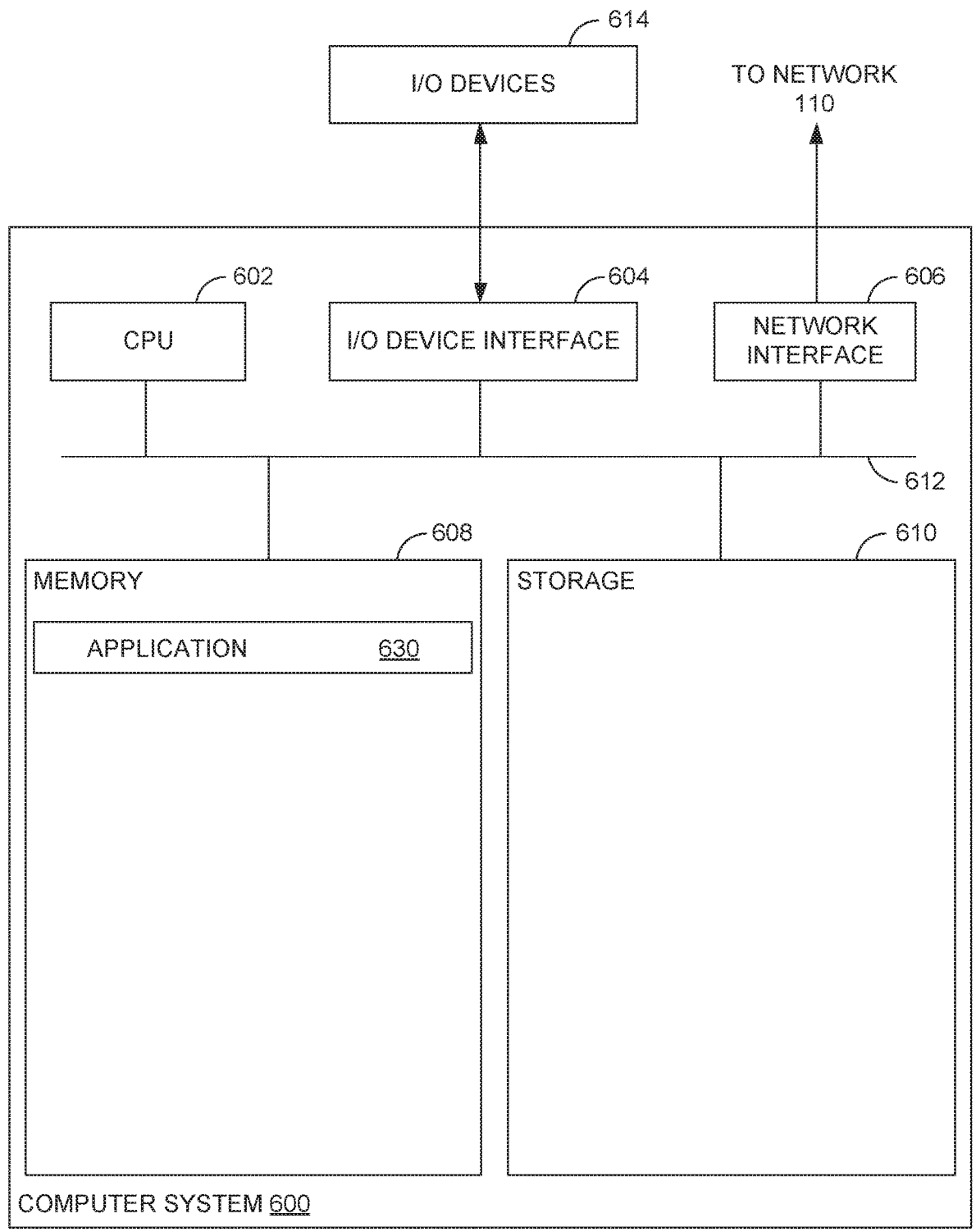
FIG. 6 illustrates an example computing system used for managing application data with witness blocks, according to one embodiment.

FIG. 6 illustrates an example development system in which data management using witness blocks may be performed, according to embodiments of the present disclosure. As shown, the system 600 includes, without limitation, a central processing unit (CPU) 602, one or more I/O device interfaces 604, which may allow for the connection of various I/O devices 614 (e.g., keyboards, displays, mouse devices, pen input, touch screens, microphones, cameras, etc.) to the system 600, network interface 606, a memory 608, storage 610, and an interconnect 612 (e.g., a bus).

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 is included to be representative of a single CPU, multiple CPUs, a single CPU having multiple processing cores, and the like. Additionally, the memory 608 is included to be representative of a random access memory. Furthermore, the storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

As shown, memory 608 includes an application 630, which may comprise a software application (e.g., local or distributed) which manages data remotely maintained on a distributed system, such as a hash chain (e.g., functionality described above with respect to FIGS. 1-5). Application 630 may use witness blocks to manage its application data in order to improve efficiency as described herein. The application 630 in memory 608 may communicate with other devices (e.g., one or more devices associated with distributed system 130) over network 110 through network interface 606 (e.g., in order to store, manage, retrieve, and validate application data from blocks 132a-n).

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for managing data of an application, comprising:
scanning a distributed system to identify one or more blocks comprising data associated with the application;
generating a witness block based on the one or more blocks, wherein the witness block comprises a state of the data from the one or more blocks;
adding the witness block to the distributed system;
determining whether the distributed system includes at least one block containing respective data associated with a respective application other than the application;
determining whether the one or more blocks and the witness block are continuous; and
choosing, based on whether the distributed system includes the at least one block containing the respective data associated with the respective application other than the application and based on whether the one or more blocks and the witness block are continuous, to replace the one or more blocks comprising data associated with the application with one or more null blocks, wherein:
the one or more null blocks comprise cryptographic link information from the one or more blocks that is different than the data from the one or more blocks, and
the one or more null blocks do not comprise the data from the one or more blocks.

2. The computer-implemented method of claim 1, further comprising archiving the one or more blocks by moving the one or more blocks to a remote data store.

3. The computer-implemented method of claim 2, further comprising:
requesting the state of the data from the distributed system; and receiving the state of the data and a proof from the distributed system.

4. The computer-implemented method of claim 3, wherein the proof comprises a root hash from the witness block.

5. The computer-implemented method of claim 4, further comprising:
confirming that the proof was received from the witness block;
computing a hash tree based on information associated with the state of the data; and
determining whether a root hash of the hash tree matches the proof.

6. The computer-implemented method of claim 1, further comprising:
identifying a plurality of null blocks; and
collapsing the plurality of null blocks into a single null block, wherein the single null block contains at least a portion of the cryptographic link information from the plurality of null blocks.

7. A computing device for managing data of an application, the computing device comprising:
a memory comprising computer-executable instructions; and
a processor configured to execute the computer-executable instructions and to cause the computing device to:
scan a distributed system to identify one or more blocks comprising data associated with the application;
generate a witness block based on the one or more blocks, wherein the witness block comprises a state of the data from the one or more blocks;
add the witness block to the distributed system;
determine whether the distributed system includes at least one block containing respective data associated with a respective application other than the application;
determine whether the one or more blocks and the witness block are continuous; and
choose, based on whether the distributed system includes the at least one block containing the respective data associated with the respective application other than the application and based on whether the one or more blocks and the witness block are continuous, to replace the one or more blocks comprising data associated with the application with one or more null blocks, wherein:
the one or more null blocks comprise cryptographic link information from the one or more blocks that is different than the data from the one or more blocks, and
the one or more null blocks do not comprise the data from the one or more blocks.

8. The computing device of claim 7, further comprising archiving the one or more blocks comprises by moving the one or more blocks to a remote data store.

9. The computing device of claim 8, wherein the processor is further configured to cause the computing device to:
request the state of the data from the distributed system; and
receive the state of the data and a proof from the distributed system.

10. The computing device of claim 9, wherein the proof comprises a root hash from the witness block.

11. The computing device of claim 10, wherein the processor is further configured to cause the computing device to:

confirm that the proof was received from the witness block;
compute a hash tree based on information associated with the state of the data; and
determine whether a root hash of the hash tree matches the proof.

12. The computing device of claim 7, wherein the processor is further configured to cause the computing device to:
identify a plurality of null blocks; and
collapse the plurality of null blocks into a single null block, wherein the single null block contains at least a portion of the cryptographic link information from the plurality of null blocks.

13. A non-transitory computer-readable medium comprising instructions that when executed by a computing device cause the computing device to perform a method for managing data of an application, comprising:
scanning a distributed system to identify one or more blocks comprising data associated with the application;
generating a witness block based on the one or more blocks, wherein the witness block comprises a state of the data from the one or more blocks;
adding the witness block to the distributed system;
determining whether the distributed system includes at least one block containing respective data associated with a respective application other than the application;
determining whether the one or more blocks and the witness block are continuous; and
choosing, based on whether the distributed system includes the at least one block containing the respective data associated with the respective application other than the application and based on whether the one or more blocks and the witness block are continuous, to replace the one or more blocks comprising data associated with the application with one or more null blocks, wherein:
the one or more null blocks comprise cryptographic link information from the one or more blocks that is different than the data from the one or more blocks, and
the one or more null blocks do not comprise the data from the one or more blocks.

14. The non-transitory computer-readable medium of claim 13, further comprising archiving the one or more blocks by moving the one or more blocks to a remote data store.

15. The non-transitory computer-readable medium of claim 14, wherein the method further comprises:
requesting the state of the data from the distributed system; and
receiving the state of the data and a proof from the distributed system.

16. The non-transitory computer-readable medium of claim 15, wherein the proof comprises a root hash from the witness block.

17. The non-transitory computer-readable medium of claim 16, wherein the method further comprises:
confirming that the proof was received from the witness block;
computing a hash tree based on information associated with the state of the data; and
determining whether a root hash of the hash tree matches the proof.

18. The non-transitory computer-readable medium of claim 13, wherein the method further comprises:
identifying a plurality of null blocks; and collapsing the plurality of null blocks into a single null block, wherein the single null block contains at least a portion of the cryptographic link information from the plurality of null blocks.

* * * * *